United States Patent
Kaya et al.

(10) Patent No.: US 7,736,267 B2
(45) Date of Patent: Jun. 15, 2010

(54) MOTOR VEHICLE AND CONTROL METHOD OF MOTOR VEHICLE

(75) Inventors: Yasuhiro Kaya, Toyota (JP); Kentaro Tomo, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 581 days.

(21) Appl. No.: 11/664,814

(22) PCT Filed: Nov. 9, 2005

(86) PCT No.: PCT/JP2005/020986

§ 371 (c)(1),
(2), (4) Date: Apr. 6, 2007

(87) PCT Pub. No.: WO2006/051998

PCT Pub. Date: May 18, 2006

(65) Prior Publication Data

US 2008/0287252 A1    Nov. 20, 2008

(30) Foreign Application Priority Data

Nov. 9, 2004  (JP) ............................. 2004-325419
Apr. 13, 2005 (JP) ............................. 2005-115491

(51) Int. Cl.
*B60W 10/04*  (2006.01)
*B60W 10/10*  (2006.01)
(52) U.S. Cl. ..................................... 477/111; 477/118
(58) Field of Classification Search .................. 477/110, 477/118
See application file for complete search history.

(56) References Cited

U.S. PATENT DOCUMENTS

| 5,713,425 | A | 2/1998 | Buschhaus et al. |
| 6,360,154 | B1 | 3/2002 | Krenn et al. |
| 2001/0032040 | A1* | 10/2001 | Albert et al. .................. 701/22 |
| 2002/0023789 | A1 | 2/2002 | Morisawa et al. |
| 2004/0038774 | A1* | 2/2004 | Kuroda et al. .................. 477/3 |

(Continued)

FOREIGN PATENT DOCUMENTS

EP    1 398 196 A2    3/2004

(Continued)

*Primary Examiner*—Sherry L Estremsky
*Assistant Examiner*—Edwin A. Young
(74) *Attorney, Agent, or Firm*—Oliff & Berridge, PLC

(57) ABSTRACT

In response to a downshift operation (step S160) in a moving motor vehicle under an accelerator released state, a torque demand correction value $T\alpha(T)$ is set to give the greater torque variation against the lower speed in a downshifting gear position and against the higher vehicle speed V, until elapse of a preset time period since the downshift operation (step S180). A torque demand Tr* to be output to a drive shaft of the motor vehicle is updated by adding the torque demand correction value $T\alpha(T)$ to a previous setting of the torque demand Tr* (step S190). A motor is controlled to decelerate the motor vehicle with the updated torque demand Tr*. The torque variation thus attained is equivalent to a temporary torque variation applied to the drive shaft with a variation in rotation speed of an engine in response to a downshift operation in a conventional motor vehicle equipped with a stepped automatic transmission for torque conversion of the output power of the engine. The arrangement of the invention thus enables the driver of the motor vehicle to have the improved gearshift feeling.

21 Claims, 11 Drawing Sheets

U.S. PATENT DOCUMENTS

| | | |
|---|---|---|
| 2004/0127326 A1 | 7/2004 | Tajmia et al. |
| 2004/0192499 A1* | 9/2004 | Sakamoto et al. .............. 477/98 |

FOREIGN PATENT DOCUMENTS

| | | |
|---|---|---|
| JP | A-9-107698 | 4/1997 |
| JP | A 10-174213 | 6/1998 |
| JP | A 10-295003 | 11/1998 |
| JP | A-2003-284202 | 10/2003 |
| JP | A-2004-190861 | 7/2004 |
| JP | A 2004-204960 | 7/2004 |

* cited by examiner

MOTOR VEHICLE AND CONTROL METHOD OF MOTOR VEHICLE

TECHNICAL FIELD

The present invention relates to a motor vehicle driven with a motor having power generation capacity, as well as to a control method of such a motor vehicle.

BACKGROUND ART

A typical example of the motor vehicle driven with the motor having power generation capacity is a hybrid vehicle, where a generator, an engine, and a drive shaft linked to drive wheels are respectively connected with a sun gear, a carrier, and a ring gear of a planetary gear mechanism, and a motor is connected to the drive shaft (see, for example, Japanese Patent Laid-Open Gazette No. H10-295003). In a deceleration drive of this hybrid vehicle, the motor is under generative control with rotation of the drive wheels to produce regenerative electric power and charge a battery with the produced regenerative electric power. The generator is controlled to drive the engine at a required rotation speed for actuation of auxiliary machinery.

DISCLOSURE OF THE INVENTION

While a conventional motor vehicle equipped with a stepped automatic transmission for torque conversion of output power of an engine runs in an accelerator released state, in response to the driver's gearshift operation, a torque variation is temporarily applied to drive wheels with a corresponding gear change of the automatic transmission. Engine brake under the varied rotation speed of the engine corresponding to the changed gear speed is then applied to the drive wheels to decelerate the motor vehicle. In the hybrid vehicle, on the other hand, a deceleration torque produced by regenerative control of the motor is applied to the drive wheels. The deceleration torque substantially equivalent to the engine brake may thus be applied to the drive wheels, in response to the driver's gearshift operation in the moving hybrid vehicle under the accelerator released state. No consideration of the gearshift feeling generally given to the driver of the conventional motor vehicle with the stepped automatic transmission, however, makes the driver of the hybrid vehicle feel uncomfortable.

The object of the invention is thus to enable the driver of a motor vehicle driven with output power of a motor having power generation capacity to have the improved gearshift feeling. The object of the invention is also to enable the driver of the motor vehicle driven with output power of the motor having power generation capacity to have the gearshift feeling equivalent to the gearshift feeling in a conventional motor vehicle equipped with a stepped automatic transmission for torque conversion of output power of an internal combustion engine. The object of the invention is further to enable the driver of the motor vehicle driven with output power of the motor having power generation capacity to have the improved gearshift feeling, while ensuring the running stability of the motor vehicle in a high vehicle speed range.

In order to attain at least part of the above and the other related objects, the motor vehicle and its control method of the invention have the configurations and the arrangements discussed below.

A first motor vehicle of the invention is directed to a motor vehicle driven with output power of a motor having power generation capacity and including: a control module that sets a deceleration torque demand corresponding to a detected gearshift position in the motor vehicle moving under an accelerator released state selected by a driver. In a gearshift position fixing condition where the driver does not change the gearshift position, the control module controls the motor to decelerate the motor vehicle with the set deceleration torque demand, and in a gearshift position changing condition where the driver shifts down the gearshift position, the control module sets a torque variation under gearshift position change to give a larger torque against a lower speed in the changed gearshift position and controls the motor to decelerate the motor vehicle with a total deceleration torque as a sum of the set deceleration torque demand and the set torque variation.

The first motor vehicle of the invention sets the deceleration torque demand corresponding to the detected gearshift position in the motor vehicle moving under the accelerator released state selected by the driver. In the gearshift position fixing condition where the driver does not change the gearshift position, the motor is controlled to decelerate the motor vehicle with the set deceleration torque demand. In the gearshift position changing condition where the driver shifts down the gearshift position, the torque variation under gearshift position change is set to give a larger torque against a lower speed in the changed gearshift position. The motor is then controlled to decelerate the motor vehicle with the total deceleration torque as the sum of the set deceleration torque demand and the set torque variation. This arrangement enables the driver of the motor vehicle to have gearshift feeling equivalent to the gearshift feeling in response to a downshift operation of a stepped automatic transmission for torque conversion of output power of an internal combustion engine. Namely this arrangement enables the driver of the motor vehicle to have the improved gearshift feeling. The 'torque variation under gearshift position change' may be defined by setting a peak of the torque variation or by setting a gradient of the torque variation.

The second motor vehicle of the invention is directed to a motor vehicle driven with output power of a motor having power generation capacity and including: a control module that sets a deceleration torque demand corresponding to a measured vehicle speed and a detected gearshift position in the motor vehicle moving under an accelerator released state selected by a driver. In a gearshift position fixing condition where the driver does not change the gearshift position, the control module controls the motor to decelerate the motor vehicle with the set deceleration torque demand, and in a gearshift position changing condition where the driver changes the gearshift position, the control module sets a torque variation under gearshift position change according to the measured vehicle speed and controls the motor to decelerate the motor vehicle with a total deceleration torque as a sum of the set deceleration torque demand and the set torque variation.

The second control module of the invention sets a deceleration torque demand corresponding to a measured vehicle speed and a detected gearshift position in the motor vehicle moving under an accelerator released state selected by a driver. In a gearshift position fixing condition where the driver does not change the gearshift position, the control module controls the motor to decelerate the motor vehicle with the set deceleration torque demand. In a gearshift position changing condition where the driver changes the gearshift position, the control module sets a torque variation under gearshift position change according to the measured vehicle speed and controls the motor to decelerate the motor vehicle with a total deceleration torque as a sum of the set deceleration torque demand and the set torque variation. Namely this arrangement enables the driver of the motor vehicle to have the improved gearshift feeling. The 'torque variation under gearshift position change' may be defined by setting a peak of the torque variation or by setting a gradient of the torque variation.

In one preferable embodiment of the second motor vehicle of the invention, the control module sets the torque variation under gearshift position change to give a smaller torque against a higher vehicle speed, in the gearshift position changing condition where the driver shifts down the gearshift position and controls the motor with the total deceleration torque including the set torque variation. This arrangement ensures the running stability of the motor vehicle that is decelerated with the total deceleration torque as the sum of the deceleration torque demand and the torque variation in a high vehicle speed range.

In the second motor vehicle of the invention, the control module may set the torque variation under gearshift position change to have a gentler gradient against a higher vehicle speed, in the gearshift position changing condition where the driver shifts down the gearshift position and controls the motor with the total deceleration torque including the set torque variation. This arrangement ensures the running stability of the motor vehicle that is decelerated with the total deceleration torque as the sum of the deceleration torque demand and the torque variation in a high vehicle speed range.

In the second motor vehicle of the invention, the control module may set the torque variation under gearshift position change to give a greater torque against a lower speed in the changed gearshift position, in the gearshift position changing condition where the driver shifts down the gearshift position and controls the motor with the total deceleration torque including the set torque variation. This arrangement enables the driver of the motor vehicle to have the improved gearshift feeling.

In one preferable embodiment of the first and second motor vehicle of the invention, the control module identifies the gearshift position changing condition to set the torque variation and control the motor until elapse of a preset time period since the change of the gearshift position. In this embodiment, the control module may vary the preset time period corresponding to the changed gearshift position. Further, the control module may vary the preset time period to have a longer time period against a lower speed in the changed gearshift position, in the gearshift position changing condition where the driver shifts down the gearshift position. In these cases, the control module may vary the preset time period according to the measured vehicle speed. This arrangement enables the driver of the motor vehicle to have the improved gearshift feeling. Moreover, the control module may vary the preset time period to have a longer time period against a higher vehicle speed, in the gearshift position changing condition where the driver shifts down the gearshift position.

The first and second motor vehicle of the invention may further include: an internal combustion engine; and an electric power-mechanical power input output mechanism that is connected to an output shaft of the internal combustion engine and to a drive shaft linked with drive wheels of the motor vehicle and outputs at least part of output power of the internal combustion engine to the drive shaft with input and output of electric power and mechanical power, and the control module may control the internal combustion engine, the electric power-mechanical power input output mechanism, and the motor to decelerate the motor vehicle. In this embodiment, the control module may control the internal combustion engine, the electric power-mechanical power input output mechanism, and the motor to decelerate the motor vehicle with a deceleration torque produced by a rotation resistance of the internal combustion engine and a deceleration torque produced by regenerative control of the motor. The electric power-mechanical power input output mechanism may include: a three shaft-type power input output module that is linked to three shafts, the output shaft of the internal combustion engine, the drive shaft, and a third rotating shaft, and automatically determines power input from and output to a residual one shaft based on powers input from and output to any two shafts among the three shafts; and a generator that is capable of inputting and outputting power from and to the third rotating shaft. The electric power-mechanical power input output mechanism may include a pair-rotor motor that has a first rotor connected to the output shaft of the internal combustion engine and a second rotor connected to the drive shaft and output at least part of the output power of the internal combustion engine to the drive shaft with input and output of electric power and mechanical power by electromagnetic function of the first rotor relative to the second rotor.

The present invention is directed to a first control method of a motor vehicle driven with output power of a motor having power generation capacity, and the control method sets a deceleration torque demand corresponding to a detected gearshift position in the motor vehicle moving under an accelerator released state selected by a driver. In a gearshift position fixing condition where the driver does not change the gearshift position, the control method controls the motor to decelerate the motor vehicle with the set deceleration torque demand, and in a gearshift position changing condition where the driver shifts down the gearshift position, the control method sets a torque variation under gearshift position change to give a larger torque against a lower speed in the changed gearshift position and controls the motor to decelerate the motor vehicle with a total deceleration torque as a sum of the set deceleration torque demand and the set torque variation.

The first control method of the motor vehicle of the invention sets the deceleration torque demand corresponding to the detected gearshift position in the motor vehicle moving under the accelerator released state selected by the driver. In the gearshift position fixing condition where the driver does not change the gearshift position, the motor is controlled to decelerate the motor vehicle with the set deceleration torque demand. In the gearshift position changing condition where the driver shifts down the gearshift position, the torque variation under gearshift position change is set to give a larger torque against a lower speed in the changed gearshift position. The motor is then controlled to decelerate the motor vehicle with the total deceleration torque as the sum of the set deceleration torque demand and the set torque variation. This arrangement enables the driver of the motor vehicle to have gearshift feeling equivalent to the gearshift feeling in response to a downshift operation of a stepped automatic transmission for torque conversion of output power of an internal combustion engine. Namely this arrangement enables the driver of the motor vehicle to have the improved gearshift feeling.

The present invention is also directed to a second control method of a motor vehicle driven with output power of a motor having power generation capacity, and the control method sets a deceleration torque demand corresponding to a measured vehicle speed and a detected gearshift position in the motor vehicle moving under an accelerator released state selected by a driver. In a gearshift position fixing condition where the driver does not change the gearshift position, the control method controls the motor to decelerate the motor vehicle with the set deceleration torque demand, and in a gearshift position changing condition where the driver changes the gearshift position, the control method sets a torque variation under gearshift position change according to the measured vehicle speed and controls the motor to decelerate the motor vehicle with a total deceleration torque as a sum of the set deceleration torque demand and the set torque variation.

The second control method of the motor vehicle of the invention sets a deceleration torque demand corresponding to a measured vehicle speed and a detected gearshift position in the motor vehicle moving under an accelerator released state selected by a driver. In a gearshift position fixing condition where the driver does not change the gearshift position, the control method controls the motor to decelerate the motor vehicle with the set deceleration torque demand. In a gearshift position changing condition where the driver changes the gearshift position, the control method sets a torque variation under gearshift position change according to the measured vehicle speed and controls the motor to decelerate the motor vehicle with a total deceleration torque as a sum of the set deceleration torque demand and the set torque variation. Namely this arrangement enables the driver of the motor vehicle to have the improved gearshift feeling.

BEST MODES OF CARRYING OUT THE INVENTION

Figure 1:
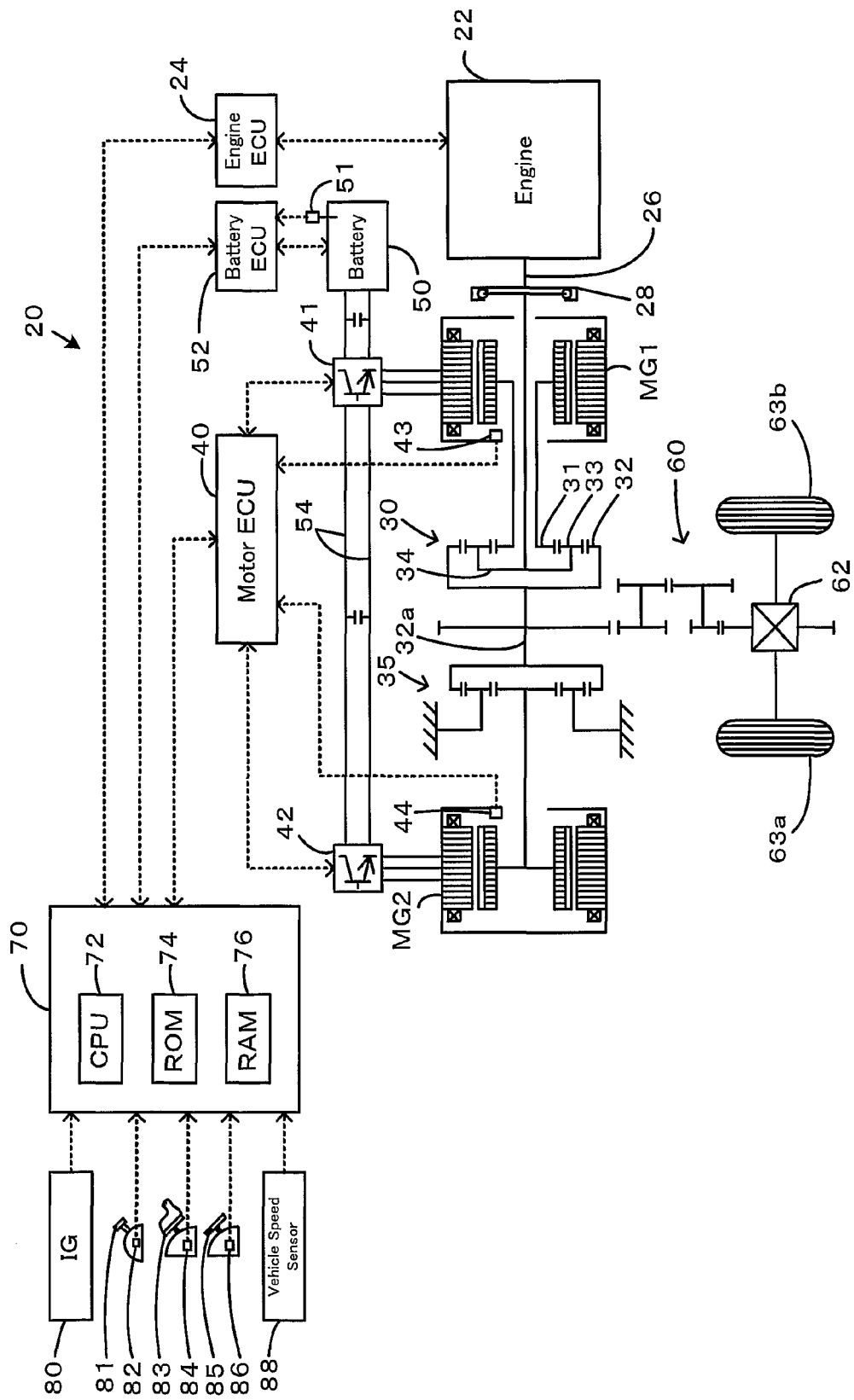
FIG. 1 schematically illustrates the configuration of a hybrid vehicle in one embodiment of the invention.

One mode of carrying out the invention is discussed below as a preferred embodiment. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is connected to the power distribution integration mechanism 30 and is capable of generating electric power, a reduction gear 35 that is attached to a ring gear shaft 32a or a drive shaft connecting with the power distribution integration mechanism 30, a motor MG2 that is linked to the reduction gear 35, and a hybrid electronic control unit 70 that controls the whole drive system of the hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
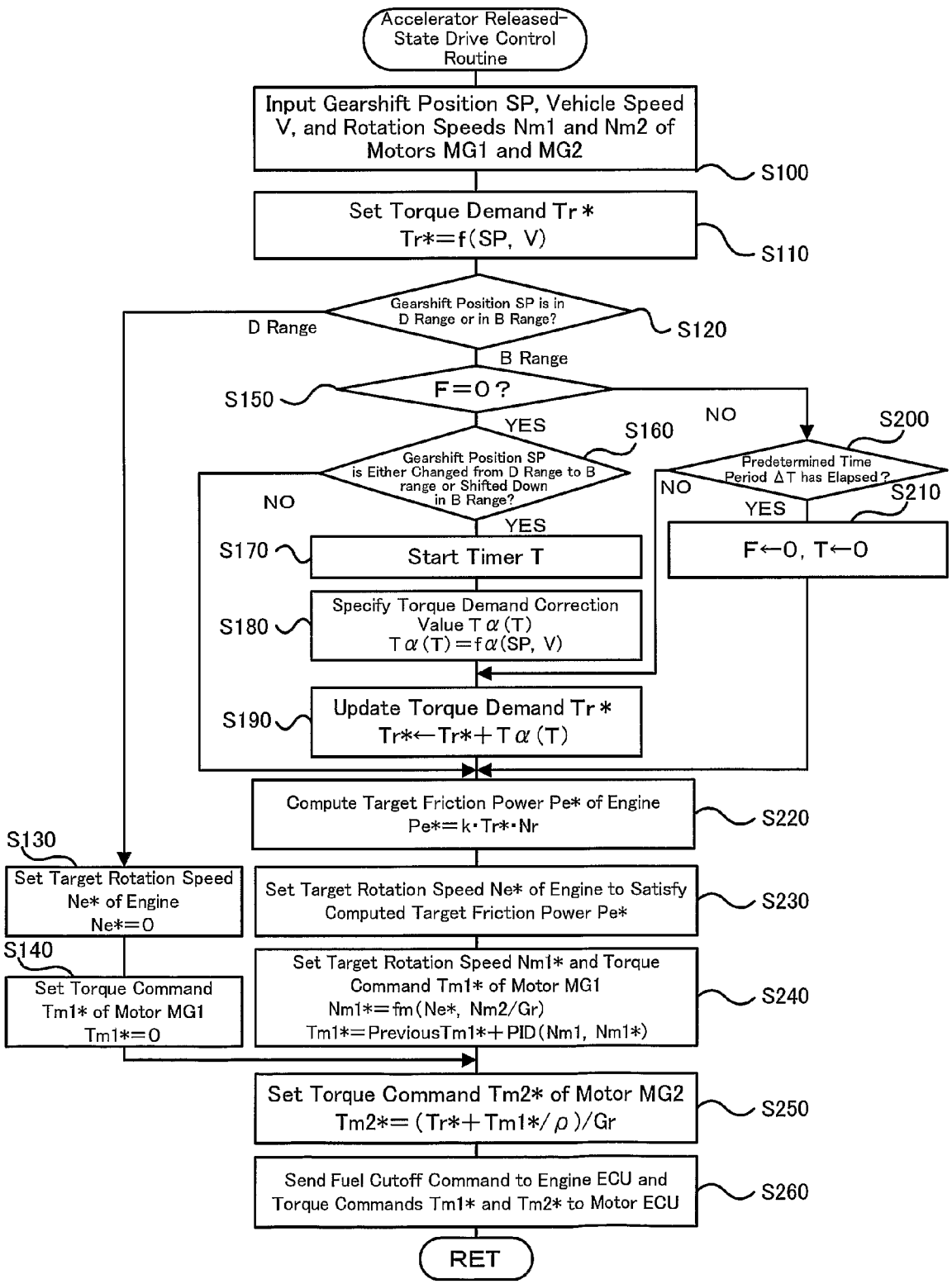
FIG. 2 is a flowchart showing an accelerator release-state drive control routine executed by a hybrid electronic control unit included in the hybrid vehicle of the embodiment.

The description regards the operations of the hybrid vehicle 20 of the embodiment constructed as discussed above, especially a series of control operations in response to the driver's release of the accelerator pedal 83 in the moving hybrid vehicle 20. FIG. 2 is a flowchart showing an accelerator released-state drive control routine executed by the hybrid electronic control unit 70 in the hybrid vehicle 20 of the embodiment. This drive control routine is carried out repeatedly at preset time intervals (for example, at every 8 msec) in the accelerator released state.

In the accelerator released-state drive control routine, the CPU 72 of the hybrid electronic control unit 70 first inputs various data required for control, that is, the gearshift position SP from the gearshift position sensor 82, the vehicle speed V from the vehicle speed sensor 88, and rotation speeds Nm1 and Nm2 of the motors MG1 and MG2 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication.

Figure 3:
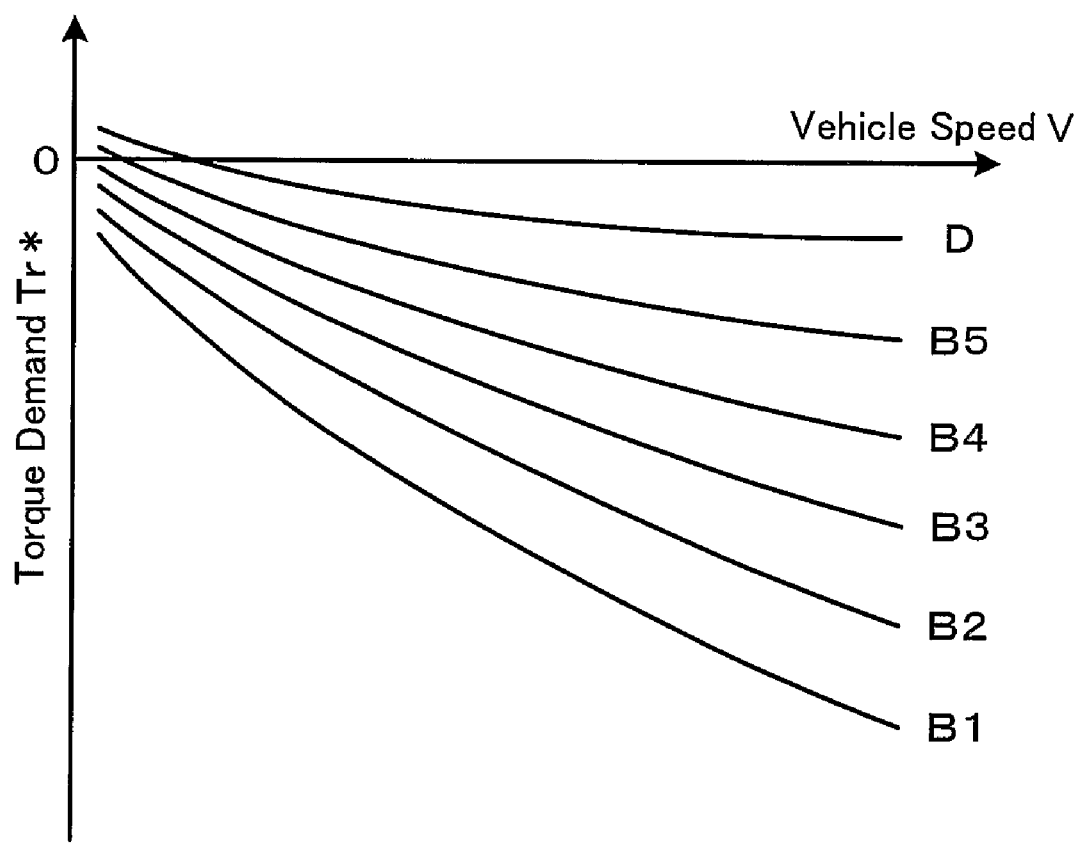
FIG. 3 shows one example of a torque demand setting map.

After the data input, the CPU 72 sets a torque demand Tr* to be output to the ring gear shaft 32a or the drive shaft, based on the input gearshift position SP and the input vehicle speed V (step S110). The concrete procedure of setting the torque demand Tr* in this embodiment stores in advance variations in torque demand Tr* against the gearshift position SP and the vehicle speed V as a torque demand setting map in the ROM 74 and reads the torque demand Tr* corresponding to the given gearshift position SP and the given vehicle speed V from the torque demand setting map. One example of the torque demand setting map is shown in FIG. 3. The torque demand setting map is designed to set positive values to the torque demand Tr* in acceleration and negative values to the torque demand Tr* in deceleration. A curve ID in the map of FIG. 3 shows a variation in torque demand Tr* against the vehicle speed V at the gearshift position SP in a D (drive) range. Curves 'B1' to 'B5' respectively show variations in torque demand Tr* against the vehicle speed V at the gearshift position SP in a B (brake) range. In the structure of this embodiment, the B range has 5-speed sequential shift. The relation between the torque demand Tr* and the vehicle speed V is set to give the smaller torque demand Tr* (that is, the greater reduction torque) against the lower speed in the B (brake) range.

The CPU 72 identifies the current gearshift position SP (step S120). When the current gearshift position SP is in the D (drive) range, the CPU 72 sets a target rotation speed Ne* of the engine 22 to 0 (step S130) to drive the hybrid vehicle 20 in the stop conditions of the engine 22 and sets a torque command Tm1* of the motor MG1 to 0 (step S140).

Figure 4:
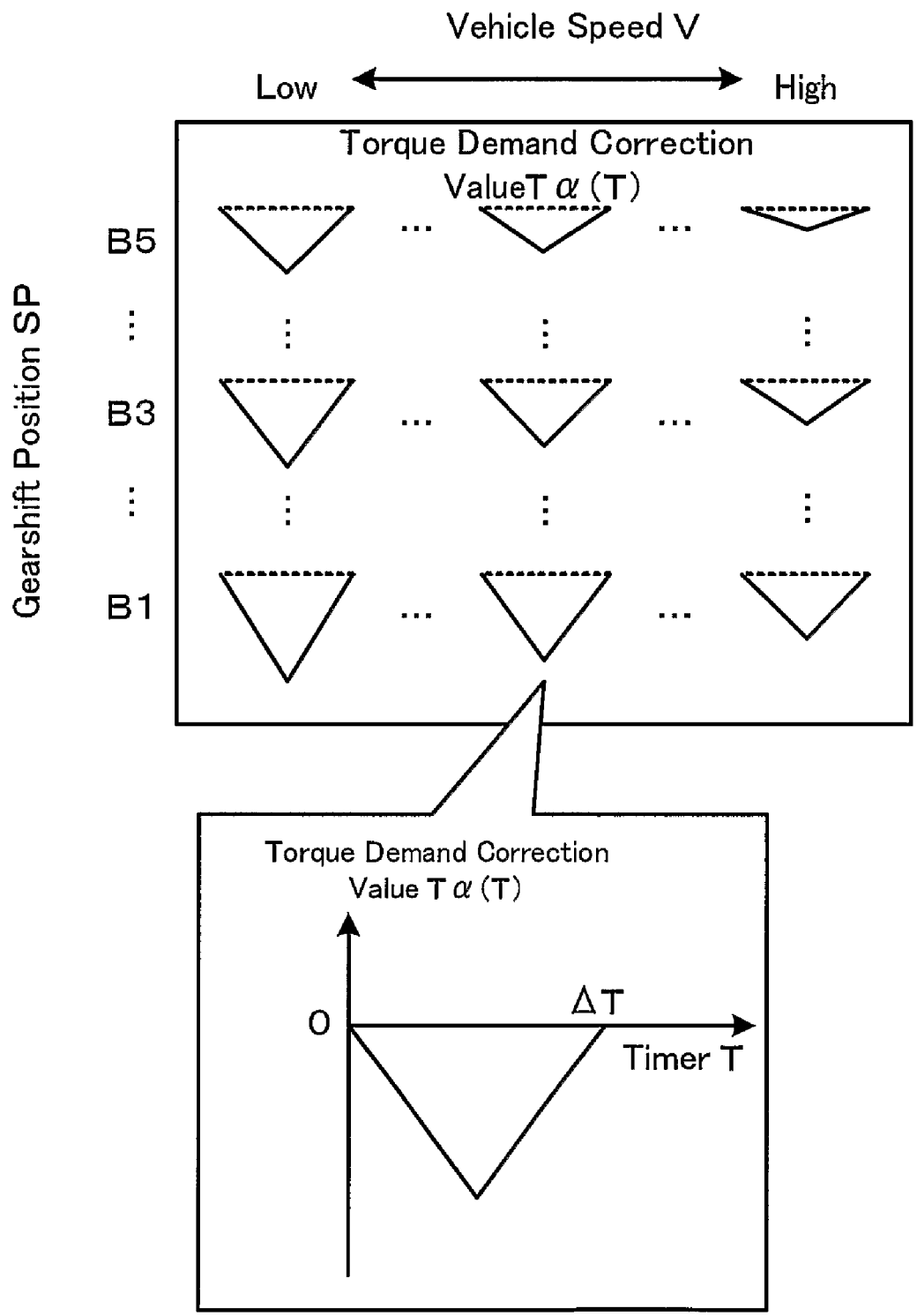
FIG. 4 shows one example of a torque demand correction value setting map.

When the current gearshift position SP is in the B (brake) range, on the other hand, the CPU 72 checks the value of a flag F (step S150). The flag F is initially set to 0 and is set to 1 by the processing of subsequent step S170. In a first cycle of this accelerator released-state drive control routine, the flag F is set equal to 0. In response to setting of the flag F equal to 0, the CPU 72 determines whether the gearshift position SP is either changed from the D range to the B range or shifted down to a lower speed in the B (brake) range, for example, from 'B4' to 'B3' (step S160). A concrete procedure of this embodiment compares the input current setting of the gearshift position SP with the previous setting of the gearshift position SP and determines whether the gearshift position SP is either changed from the D range to the B range or shifted down to the lower speed in the B range. When it is determined at step S160 that the gearshift position SP is either changed from the D range to the B range or shifted down to the lower speed in the B range, the CPU 72 sets the flag F1 to 1 and starts a timer T (step S170). The CPU 72 then specifies a torque demand correction value Tα(T), which varies with the time count on the timer T, based on the combination of the input gearshift position SP and the input vehicle speed V (step S180), and updates the toque demand Tr* by adding the specified torque demand correction value Tα(T) to the torque demand Tr* set at step S110 (step S190). The concrete procedure of specifying the torque demand correction value Tα(T) in this embodiment stores in advance variations in torque demand correction value Tα(T) against the gearshift position SP and the vehicle speed V as a torque demand correction value setting map in the ROM 74 and reads the torque demand correction value Tα(T) corresponding to the given gearshift position SP and the given vehicle speed V from the torque demand correction value setting map. One example of the torque demand correction value setting map is shown in FIG. 4. The torque demand correction value setting map is designed to vary the torque demand correction value Tα(T) in V shape with the time count on the timer T until elapse of a predetermined time period ΔT. The lower speed in the B (brake) range and the lower vehicle speed V give the greater V-shaped variation of the torque demand correction value Tα(T). The higher speed in the B range and the higher vehicle speed V give the smaller V-shaped variation of the torque demand correction value Tα(T). The V-shaped variation is defined by the peak and the gradient of the torque demand correction value Tα(T). It is assumed that a conventional motor vehicle equipped with a stepped automatic transmission for torque conversion of output power of an engine is decelerated in the accelerator released state. Immediately after a downshift operation in the decelerating motor vehicle, a torque variation is temporarily applied to drive wheels with a variation in rotation speed of the engine. Engine brake under the varied rotation speed of the engine is then applied to the drive wheels. The update of the torque demand Tr* by addition of the torque demand correction value Tα(T) in the drive control of this embodiment attains a torque variation similar to this temporary torque variation immediately after the downshift operation in the conventional motor vehicle. Such correction thus enables the driver of the hybrid vehicle 20 to have the gearshift feeling equivalent to the gearshift feeling in the conventional motor vehicle equipped with the stepped automatic transmission. In the torque demand correction value setting map of FIG. 4, the torque demand correction value Tα(T) is set to have the smaller torque variation, that is, the smaller absolute value of the peak and the gentler gradient, against the higher vehicle speed V. This setting is attributed to the characteristic of the torque demand setting map of FIG. 3 that gives the smaller torque demand Tr* (the greater absolute value of the torque demand Tr*) against the higher vehicle speed V. Addition of the torque demand correction value Tα(T) having the greater absolute value of the peak and the steeper gradient to the torque demand Tr* causes an excess reduction torque to be applied to the ring gear shaft 32a. Application of the excess reduction torque may lead to unstable behaviors of the vehicle under certain road surface conditions (for example, low β road surface). When it is determined at step S160 that the gearshift position SP is neither changed from the D range to the B range nor shifted down to the lower speed in the B range, the routine skips the processing of steps S170 to S190 and immediately goes to step S220.

The CPU 72 then computes a target friction power Pe* of the engine 22 as a product of the torque demand Tr*, a rotation speed Nr of the ring gear shaft 32a, and a preset factor k (for example, 0.5) (step S220), and sets a target rotation speed Ne* of the engine 22 to satisfy the computed target friction power Pe* (step S230). The concrete procedure of setting the target rotation speed Ne* of the engine 22 in this embodiment stores in advance a variation in target rotation speed Ne* against the target friction power Pe* as a map (not shown) in the ROM 74 and reads the target rotation speed Ne* corresponding to the given target friction power Pe* from the map.

The CPU 72 subsequently calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 (that is, a ratio of the number of teeth of the sun gear 31 to the number of teeth of the ring gear 32) according to Equation (1) given below, while calculating a torque command Tm1* of the motor MG1 from the calculated target rotation speed Nm1* and the current rotation speed Nm1 of the motor MG1 according to Equation (2) given below (step S240):

$$Nm1^* = (Ne^* \cdot (1+\rho) - Nm2/Gr)/\rho \quad (1)$$

$$Tm1^* = \text{Previous } Tm1^* + KP(Nm1^* - Nm1) + KI\int(Nm1^* - Nm1)dt \quad (2)$$

Figure 5:
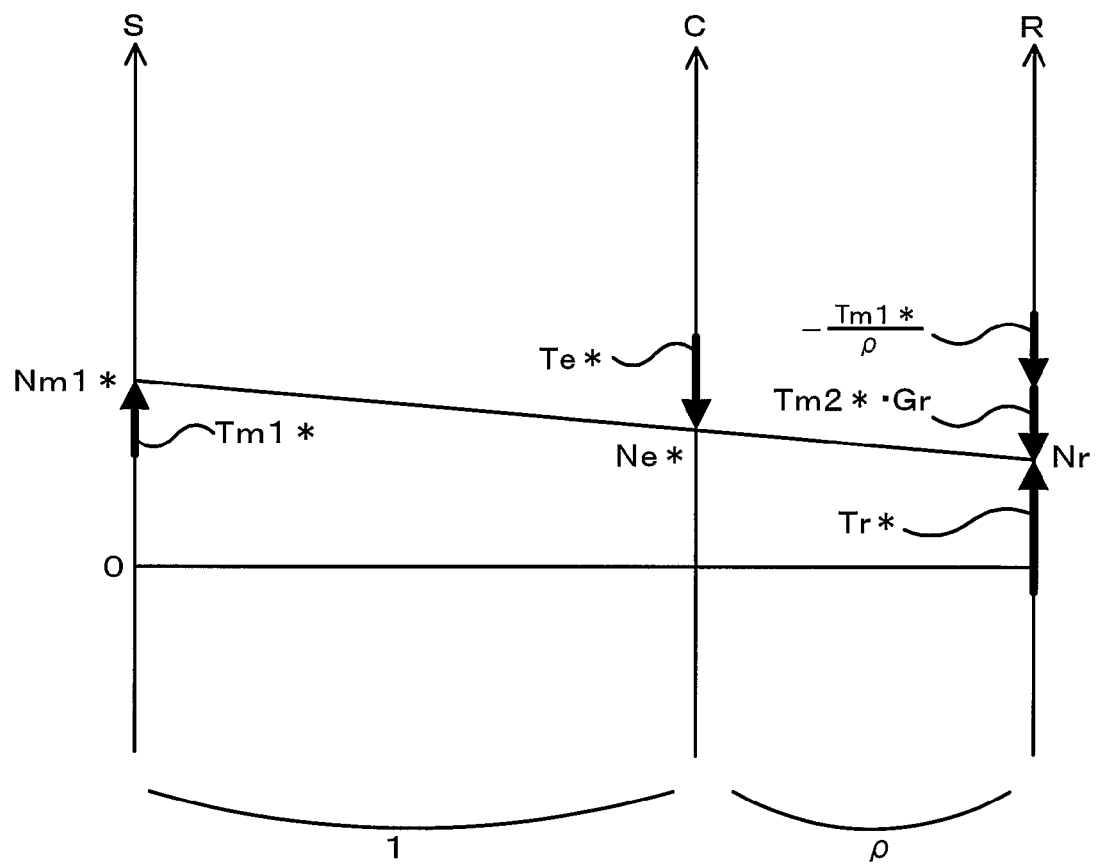
FIG. 5 is an alignment chart showing torque-rotation speed dynamics of respective rotational elements of a power distribution integration mechanism included in the hybrid vehicle of FIG. 1.

FIG. 5 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (the ring gear shaft 32a). The target rotation speed Nm1* of the motor MG1 is accordingly calculated from the rotation speed Nr of the ring gear shaft 32a, the target rotation speed Ne* of the engine 22, and the gear ratio ρ of the power distribution integration mechanism 30 according to Equation (1) given above. The torque command Tm1* of the motor MG1 is set to ensure rotation of the motor MG1 at the target rotation speed Nm1*. Such drive control of the motor MG1 enables the engine 22 to be rotated at the target rotation speed Ne*. Equation (2) is a relational expression of feedback control to drive and rotate the motor MG1 at the target rotation speed Nm1*. In Equation (2) given above, 'KP' in the second term and 'KI' in the third term on the right side respectively denote a gain of the proportional and a gain of the integral term. Two thick arrows on the axis 'R' in the alignment chart of FIG. 5 respectively show a torque that is transmitted to the ring gear shaft 32a when a friction torque Te* (=Pe*/Ne*) is output from the engine 22 under the fuel cutoff condition in the state of steady operation of the engine 22 at the target rotation speed Ne* by the motor MG1, and a torque that is applied to the ring gear shaft 32a when a torque Tm2* is output from the motor MG2.

After setting the torque command Tm1* of the motor MG1 at step S140 or at step S240, the CPU 72 calculates a torque command Tm2* to be output from the motor MG2 to ensure application of the torque demand Tr* to the ring gear shaft 32a (step S250). The torque command Tm2* of the motor MG2 is calculated from the torque demand Tr*, the torque command Tm1* of the motor MG1, the gear ratio ρ of the power distribution integration mechanism 30, and the gear ratio Gr of the reduction gear 35 according to Equation (3) given below:

$$Tm2^* = (Tr^* + Tm1^*/\rho)/Gr \qquad (3)$$

Equation (3) depends upon the torque balance on the axis 'R' in the alignment chart of FIG. 5.

After setting the target rotation speed Ne* of the engine 22 and the torque commands Tm1* and Tm2* of the motors MG1 and MG2, the CPU 72 sends a fuel cutoff command to the engine ECU 24, while sending the torque commands Tm1* and Tm2* of the motors MG1 and MG2 to the motor ECU 40 (step S260). The CPU 72 then exits from this accelerator released-state drive control routine. The engine ECU 24 receives the fuel cutoff command and controls the engine 22 under the fuel cutoff condition. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*.

In repetition of the accelerator released-state drive control routine, it is determined at step S150 that the flag F is equal to 1. The CPU 72 then determines whether the predetermined time period ΔT has elapsed since the start of the timer T (step S200). When the predetermined time period ΔT has not yet elapsed, the torque demand Tr* is updated by adding the torque demand correction value Tα(T), which varies with the time count on the timer T as shown by the torque demand correction value setting map of FIG. 4, to the torque demand Tr* set at step S110 (step S190). The CPU 72 then executes the processing of and after step S220 as described above. When the predetermined time period ΔT has elapsed, the CPU 72 does not update the torque demand Tr* by addition of the torque demand correction value Tα(T) but sets the flag F to 0 and resets the timer T to 0 (step S210). The CPU 220 then goes to step S220 and subsequent steps.

Figure 6:
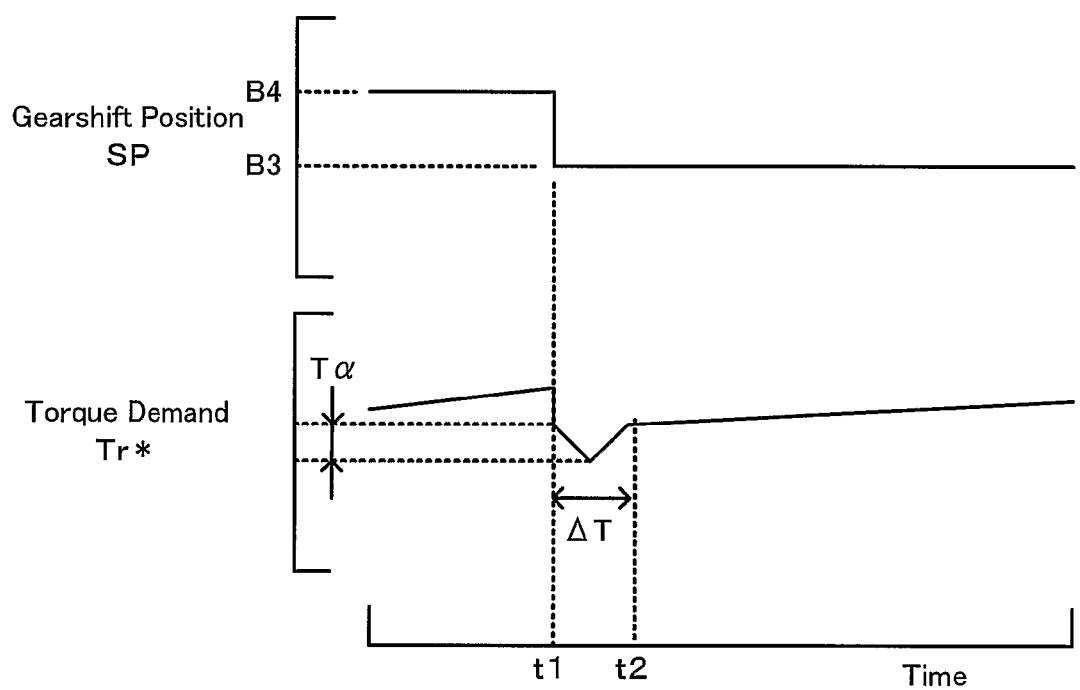
FIG. 6 shows time variations of gearshift position SP and torque demand Tr* in the moving hybrid vehicle under an accelerator released state.

FIG. 6 shows time variations of the gearshift position SP and the torque demand Tr* in the moving hybrid vehicle 20 under the accelerator released state. In the illustrated example of FIG. 6, at a time pint t1, the gearshift position SP is shifted down from 'B4' to 'B3' in the B (brake) range in the moving hybrid vehicle 20 under the accelerator released state. Until a time pint t2 when a predetermined time period ΔT has elapsed since the downshift operation, the torque demand Tr* to be output to the ring gear shaft 32a is updated by addition of the torque demand correction value Tα(T) to attain the greater torque variation against the downshift to the lower speed in the B range and against the lower vehicle speed V. The update of the torque demand Tr* by addition of the torque demand correction value Tα(T) attains a torque variation similar to a temporary torque variation applied to a drive shaft with a variation in rotation speed of an engine in response to a downshift operation in a conventional motor vehicle equipped with a stepped automatic transmission for torque conversion of output power of the engine. Such correction thus enables the driver of the hybrid vehicle 20 to have the gearshift feeling equivalent to the gearshift feeling in the conventional motor vehicle with the stepped automatic transmission.

As described above, in response to a change of the gearshift position SP from the D range to the B range or in response to a downshift of the gearshift position SP to the lower speed in the B range in the moving vehicle under the accelerator released state, the hybrid vehicle 20 of the embodiment specifies the torque demand correction value Tα(T) based on the gearshift position SP (or the speed in the B range) and the vehicle speed V. The torque demand Tr* to be output to the ring gear shaft 32a or the drive shaft is updated by addition of the specified torque demand correction value Tα(T) to the previous setting of the torque demand Tr*. The engine 22 and the motors MG1 and MG2 are then controlled to ensure output of the updated torque demand Tr* to the ring gearshaft 32a. Such drive control of the embodiment enables the driver of the hybrid vehicle 20 to have the gearshift feeling equivalent to the gearshift feeling in response to a downshift operation in a conventional motor vehicle equipped with a stepped automatic transmission for torque conversion of the output power of the engine. Namely the technique of this embodiment enables the driver of the hybrid vehicle to have the improved gearshift feeling. The torque demand correction value Tα(T) is set to give the smaller torque variation against the higher vehicle speed V. Such setting effectively prevents unstable behaviors of the hybrid vehicle in a high vehicle speed range, which is decelerated with the updated torque demand Tr* including the torque demand correction value Tα(T). This enables the driver of the hybrid vehicle to have the improved gearshift feeling, while ensuring the running stability of the hybrid vehicle in the high vehicle speed range.

In response to a downshift of the gearshift position SP in the B range in the moving vehicle under the accelerator released state, the hybrid vehicle 20 of the embodiment updates the torque demand Tr* by addition of the specified torque demand correction value Tα(T). One possible modification may update the torque demand Tr* by addition of the specified torque demand correction value Tα(T), in response to an upshift of the gearshift position SP in the B range.

Figure 7:
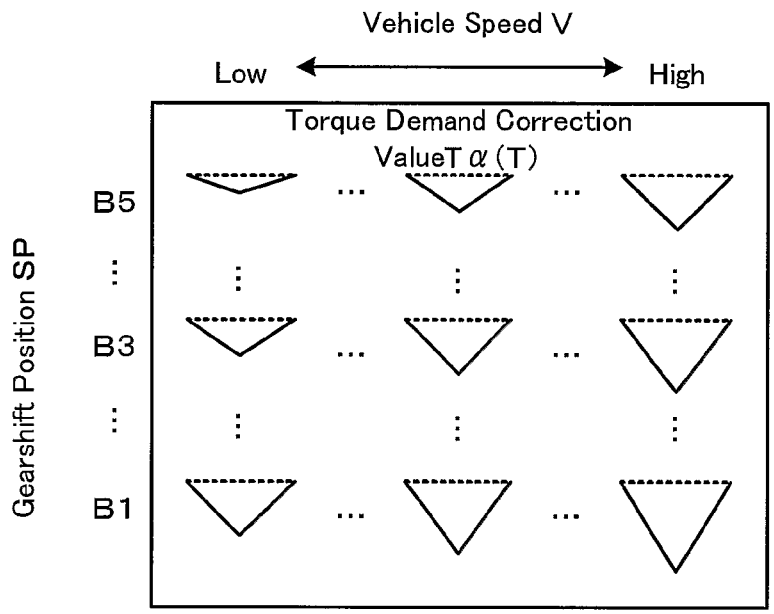
FIG. 7 shows another example of the torque demand correction value setting map.
Figure 8:
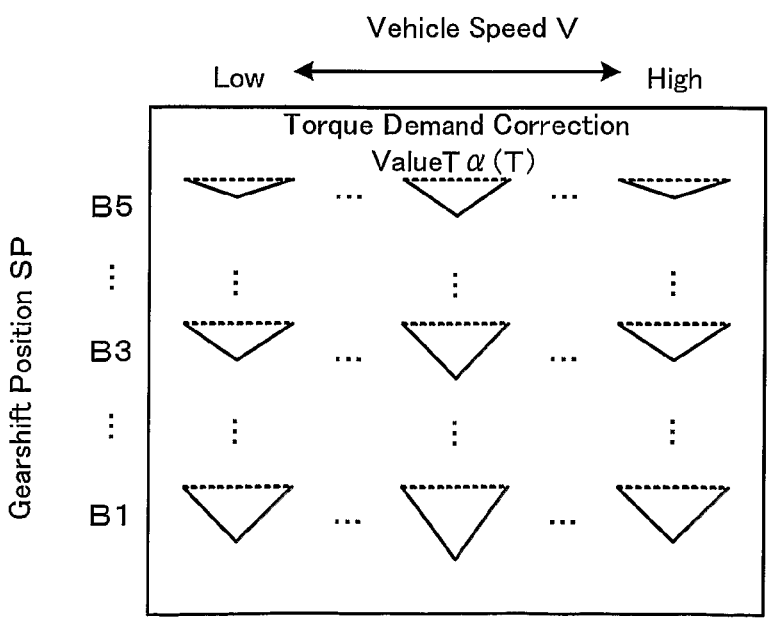
FIG. 8 shows still another example of the torque demand correction value setting map.

In response to a change of the gearshift position SP from the D range to the B range or in response to a downshift of the gearshift position SP in the B range in the moving vehicle under the accelerator released state, the hybrid vehicle 20 of the embodiment sets the torque demand correction value Tα(T) to give the greater torque variation against the lower speed in the B range and against the lower vehicle speed V. Such setting is, however, not essential. For example, the torque demand correction value Tα(T) may be set to give the greater torque variation against the higher vehicle speed V, as shown in FIG. 7. In another example, the torque demand correction value Tα(T) may be set to reach a peak value against a preset vehicle speed (for example, 70 km/hour or 80 km/hour) and to give the smaller torque variation with an increase in distance from the preset vehicle speed, as shown in FIG. 8. In still another example, the torque demand correction value Tα(T) may be set corresponding to only the speed in the B range, regardless of the vehicle speed V. Any of these modified settings enables the driver of the hybrid vehicle to have the gearshift feeling according to the characteristics of the vehicle.

In response to a change of the gearshift position SP from the D range to the B range or in response to a downshift of the gearshift position SP in the B range in the moving vehicle under the accelerator released state, the hybrid vehicle 20 of the embodiment updates the torque demand Tr* by addition of the specified torque demand correction value Tα(T) until elapse of the preset time period ΔT, which is fixed regardless of the speed in the B range and the vehicle speed V. The time period ΔT may, however, be varied according to the speed in the B range and the vehicle speed V. In this modified arrangement, the torque demand correction value setting map of FIG. 4 referred to at step S180 to set the torque demand correction value Tα(T) in the accelerator released-state drive control routine of FIG. 2 is replaced with a torque demand correction value setting map of FIG. 9 or with a torque demand correction value setting map of FIG. 10. This modified arrangement enables the driver of the hybrid vehicle to have the improved gearshift feeling. In the torque demand correction value setting map of FIG. 9, the torque demand correction value Tα(T) is set to have a torque variation over the longer time period ΔT against the lower speed in the B range and against the higher vehicle speed V. In the torque demand correction value setting map of FIG. 10, the torque demand correction value Tα(T) is set to have a torque variation over the longer time period ΔT against the lower speed in the B range and against the lower vehicle speed V. These examples are not restrictive but are only illustrative. The time period ΔT may be varied in diversity of other profiles according to both or either one of the speed in the B range and the vehicle speed V. In this modified arrangement with the varying time period ΔT, the torque demand correction value Tα(T) may be set to have a fixed torque variation, regardless of the vehicle speed V and the gearshift position SP.

Figure 9:
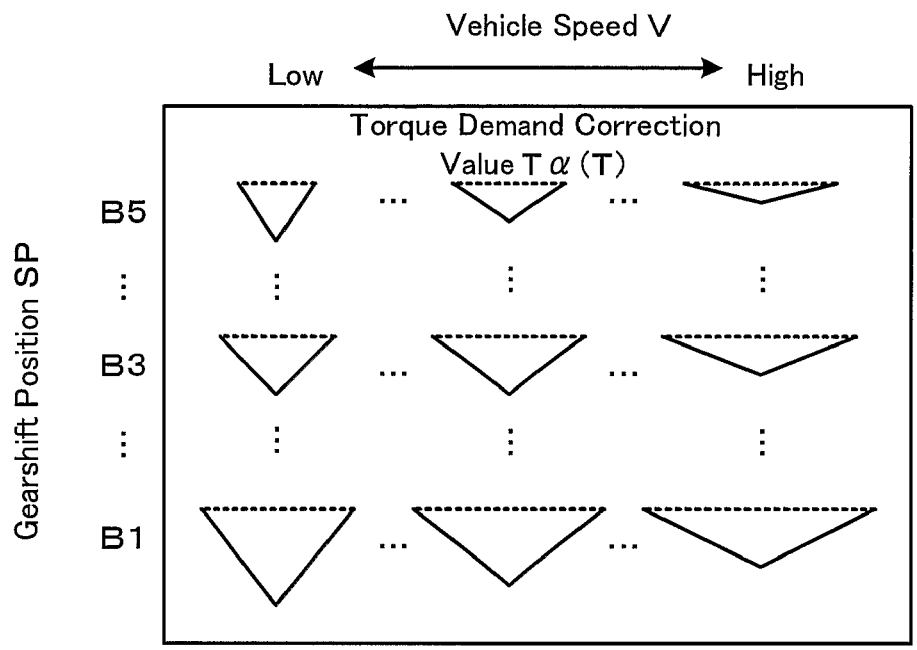
FIG. 9 shows another example of the torque demand correction value setting map.
Figure 10:
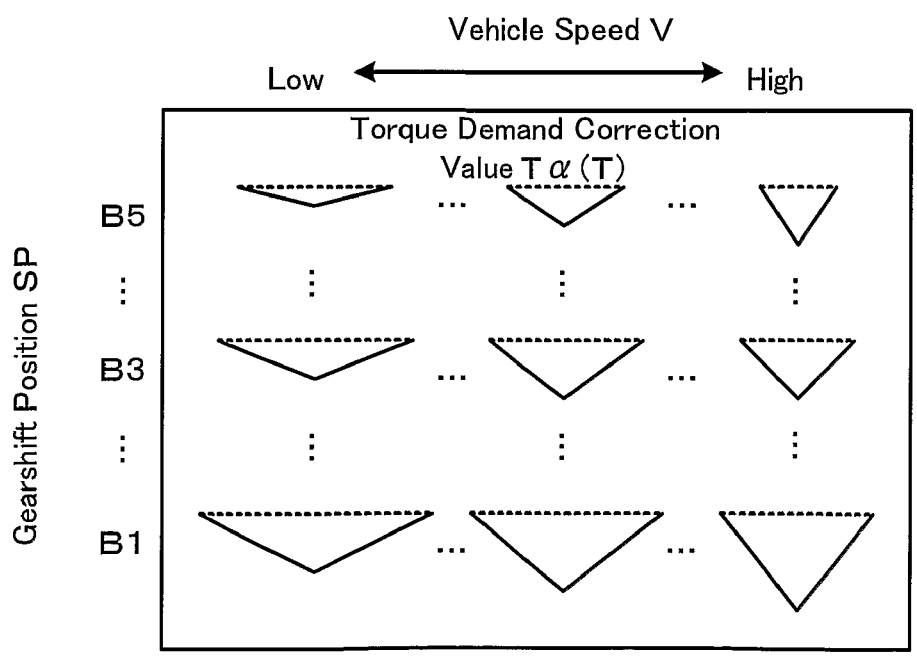
FIG. 10 shows still another example of the torque demand correction value setting map.
Figure 11:
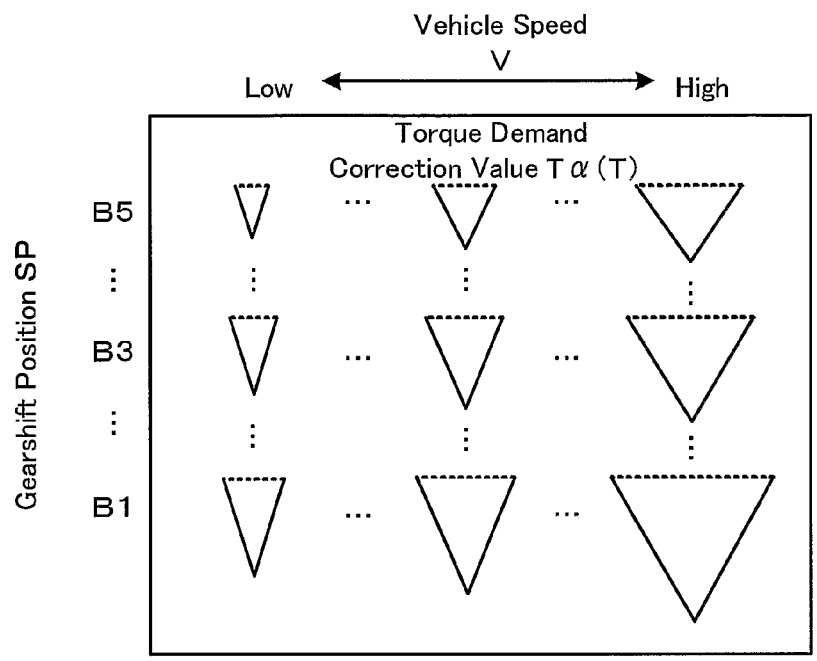
FIG. 11 shows another example of the torque demand correction value setting map.
Figure 12:
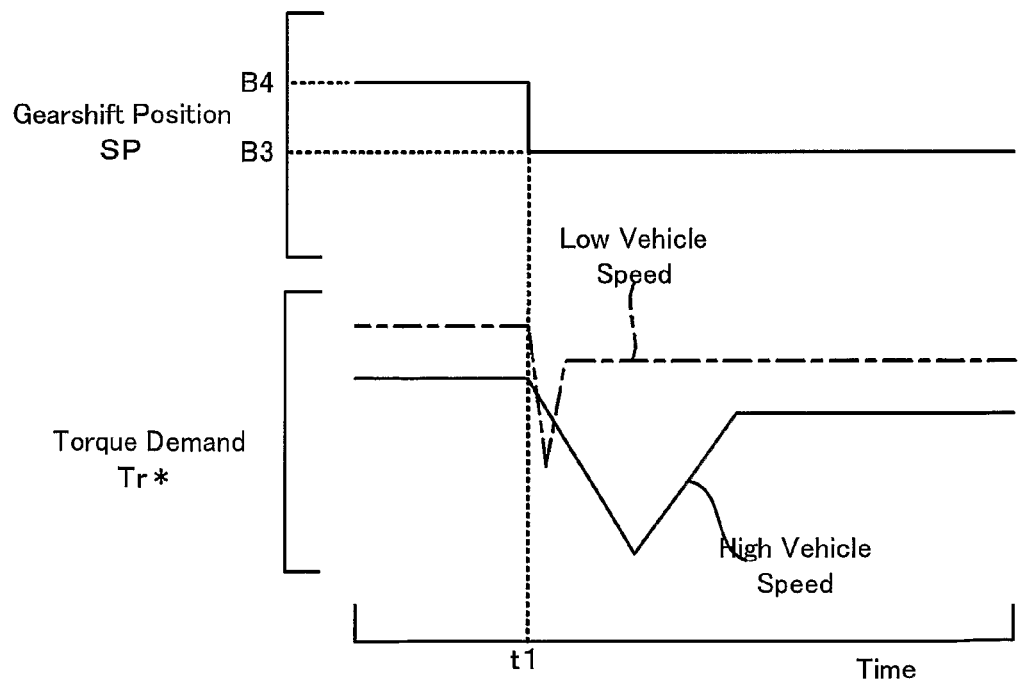
FIG. 12 shows a time variation of the torque demand Tr* based on the torque demand correction value setting map of FIG. 11 in response to a downshift operation of a gearshift lever from 'B4' to 'B3' in the moving hybrid vehicle under the accelerator released state.

In the torque demand correction value setting map of FIG. 9, regulation of the time period ΔT causes the torque demand correction value Tα(T) to have the smaller absolute value of the peak and the gentler gradient, against the higher vehicle speed V. In another example of the torque demand correction value setting map, regulation of the time period ΔT may cause the torque demand correction value Tα(T) to have the greater absolute value of the peak and the gentler gradient against the higher vehicle speed V. This modified example of the torque demand correction value setting map is shown in FIG. 11. In still another example of the torque demand correction value setting map, the torque demand correction value Tα(T) may be set to have a fixed absolute value of the peak and the gentler gradient against the higher vehicle speed V. Any of these settings of the torque demand correction value Tα(T) effectively prevents an abrupt change of the torque demand Tr* in a high vehicle speed range. This prevents unstable behaviors of the hybrid vehicle in a high vehicle speed range, which is decelerated with the updated torque demand Tr* including the torque demand correction value Tα(T). FIG. 12 shows a time variation of the torque demand Tr* based on the torque demand correction value setting map of FIG. 11 in response to a downshift operation of the gearshift lever 81 from 'B4' to 'B3' in the moving hybrid vehicle under the accelerator released state.

In the hybrid vehicle 20 of the embodiment, under the setting of the gearshift position SP in the B range, the torque demand Tr* is satisfied by a deceleration torque produced by friction of the engine 22 and a deceleration torque produced by regenerative control of the motor MG2. The torque demand Tr* may otherwise be satisfied by only the deceleration torque produced by regenerative control of the motor MG2.

In the hybrid vehicle 20 of the embodiment and its modified examples, the available options of the gearshift position SP of the gearshift lever 81 include the B (brake) range. The available options of the gearshift position SP of the gearshift lever 81 may include a sports (S) range, in addition to or in place of the B range. In the S range, the engine 22 is controlled to be driven independently, while the motor MG1 is driven and controlled to stop the torque output. The motor MG2 is under generative control to output a torque equivalent to the torque command Tm2* set by dividing the torque demand Tr* by the gear ratio Gr of the reduction gear 35.

Figure 13:
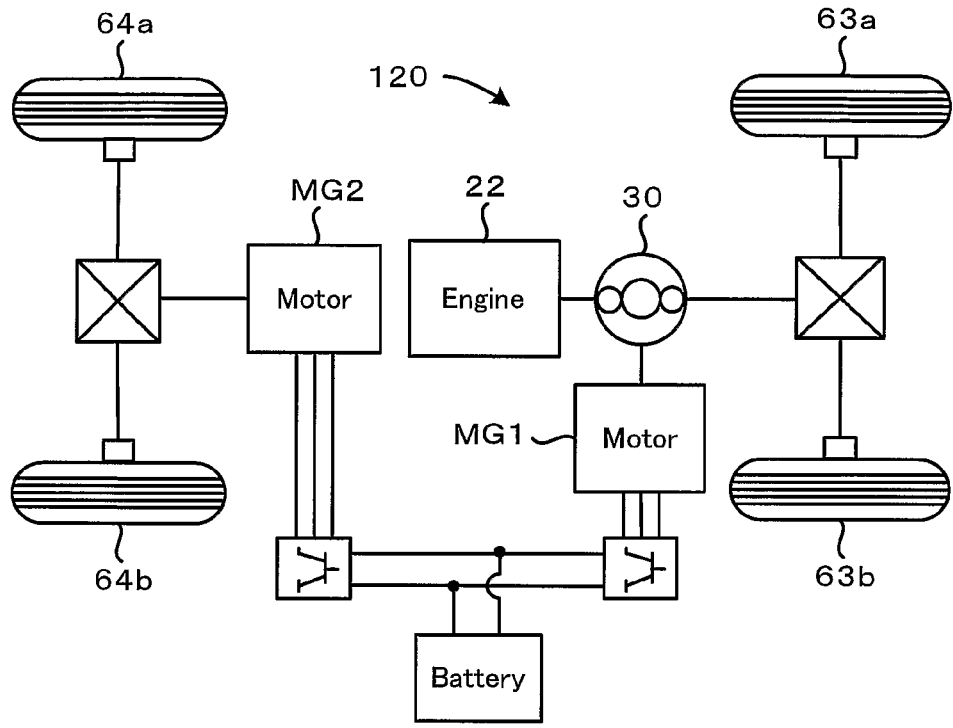
FIG. 13 schematically illustrates the structure of another hybrid vehicle in one modified example.
Figure 14:
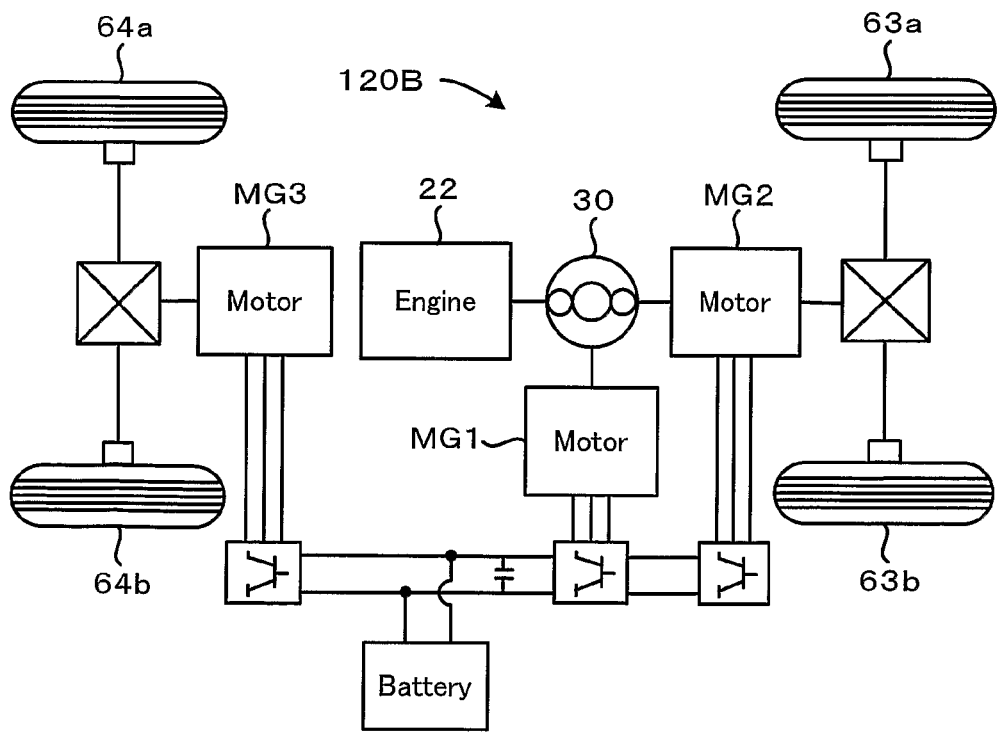
FIG. 14 schematically illustrates the structure of still another hybrid vehicle in another modified example.

In the hybrid vehicle 20 of the embodiment described above, the power of the motor MG2 is converted by the gear change in the reduction gear 35 and is output to the ring gear shaft 32a. The technique of the invention is, however, not restricted to this configuration but is also applicable to a hybrid vehicle 120 of a modified configuration shown in FIG. 13 or to a hybrid vehicle 120B of another modified configuration shown in FIG. 14. In the hybrid vehicle 120 of FIG. 13, the power of the motor MG2 is connected to a different axle (axle linked to wheels 64a and 64b) from the axle connecting with the ring gear shaft 32a (axle linked to the drive wheels 63a and 63b). In the hybrid vehicle 120B of FIG. 14, the power of the motor MG2 is connected to the axle linked to the drive wheels 63a and 63b, whereas another motor MG3 is connected to an axle linked to wheels 64a and 64b.

Figure 15:
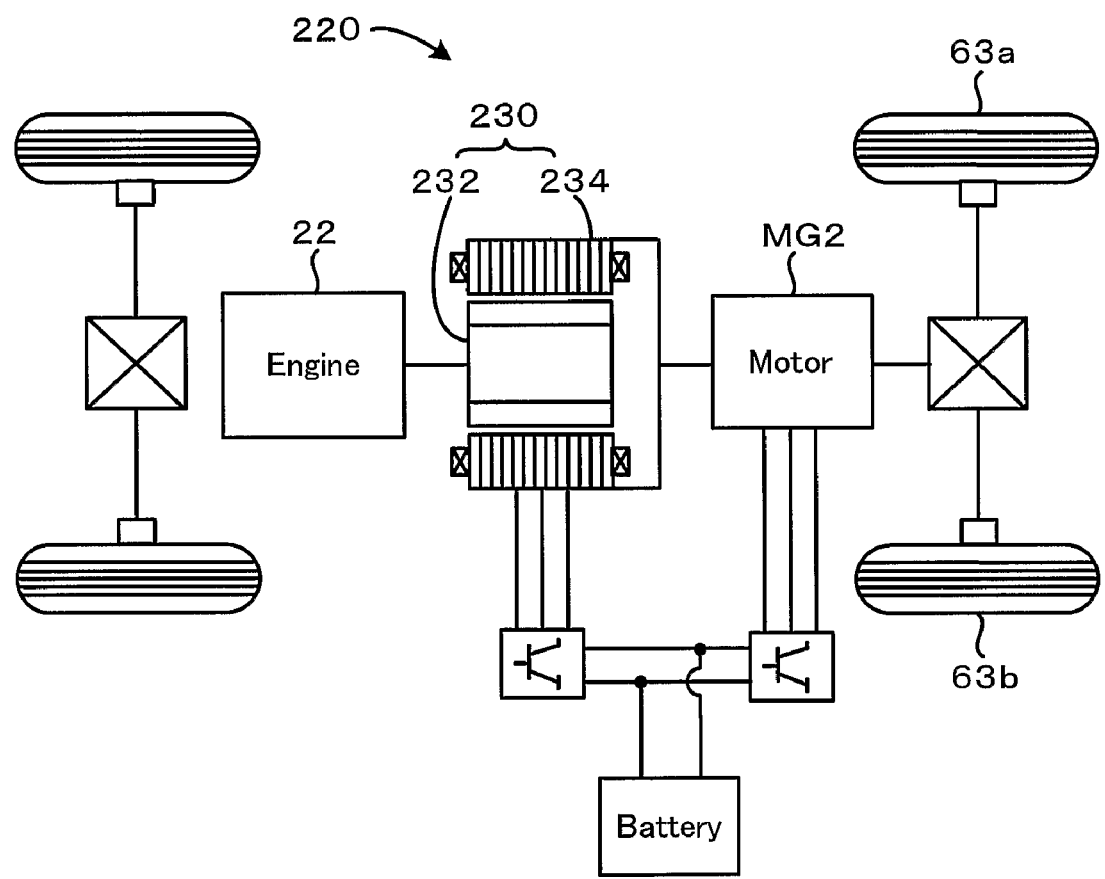
FIG. 15 schematically illustrates the structure of another hybrid vehicle in still another modified example.

In the hybrid vehicle 20 of the embodiment described above, the output power of the engine 22 is transmitted to the ring gear shaft 32a or the drive shaft linked to the drive wheels 63a and 63b via the power distribution integration mechanism 30. The technique of the invention is also applicable to a hybrid vehicle 220 of a modified structure shown in FIG. 15. The hybrid vehicle 220 of FIG. 15 is equipped with a pair rotor motor 230, which includes an inner rotor 232 connected to a crankshaft of the engine 22 and an outer rotor 234 connected to the drive shaft to output the power to the drive wheels 63a and 63b. The pair rotor motor 230 transmits part of the output power of the engine 22 to the drive shaft, while converting the residual engine power into electric power.

The technique of the invention is not restricted to these hybrid vehicles equipped with both the engine and the motor as the power source but is also applicable to electric vehicles that do not have an engine but are equipped with only a motor as the power source.

The embodiment and its modifications discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applied to automobile industries.

The invention claimed is:

1. A motor vehicle driven with output power of a motor having power generation capacity, said motor vehicle comprising:
    a control module that sets a deceleration torque demand corresponding to a detected gearshift position in said motor vehicle moving under an accelerator released state selected by a driver,
    in a gearshift position fixing condition where the driver does not change the gearshift position, said control module controlling the motor to decelerate said motor vehicle with the set deceleration torque demand,
    in a gearshift position changing condition where the driver shifts down the gearshift position, said control module setting a torque variation under gearshift position change to give a larger torque against a lower speed in the changed gearshift position and controlling the motor to decelerate said motor vehicle with a total deceleration torque as a sum of the set deceleration torque demand and the set torque variation.

2. A motor vehicle in accordance with claim 1, wherein said control module identifies the gearshift position changing condition to set the torque variation and control the motor until elapse of a preset time period since the change of the gearshift position.

3. A motor vehicle in accordance with claim 2, wherein said control module varies the preset time period corresponding to the changed gearshift position.

4. A motor vehicle in accordance with claim 3, wherein said control module varies the preset time period to have a longer time period against a lower speed in the changed gearshift position, in the gearshift position changing condition where the driver shifts down the gearshift position.

5. A motor vehicle in accordance with claim 2, wherein said control module varies the preset time period according to the measured vehicle speed.

6. A motor vehicle in accordance with claim 5, wherein said control module varies the preset time period to have a longer time period against a higher vehicle speed, in the gearshift position changing condition where the driver shifts down the gearshift position.

7. A motor vehicle driven with output power of a motor having power generation capacity, said motor vehicle comprising:
a control module that sets a deceleration torque demand corresponding to a measured vehicle speed and a detected gearshift position in said motor vehicle moving under an accelerator released state selected by a driver,
in a gearshift position fixing condition where the driver does not change the gearshift position, said control module controlling the motor to decelerate said motor vehicle with the set deceleration torque demand,
in a gearshift position changing condition where the driver changes the gearshift position, said control module setting a torque variation under gearshift position change according to the measured vehicle speed and controlling the motor to decelerate said motor vehicle with a total deceleration torque as a sum of the set deceleration torque demand and the set torque variation.

8. A motor vehicle in accordance with claim 7, wherein said control module sets the torque variation under gearshift position change to give a smaller torque against a higher vehicle speed, in the gearshift position changing condition where the driver shifts down the gearshift position and controls the motor with the total deceleration torque including the set torque variation.

9. A motor vehicle in accordance with claim 7, wherein said control module sets the torque variation under gearshift position change to have a gentler gradient against a higher vehicle speed, in the gearshift position changing condition where the driver shifts down the gearshift position and controls the motor with the total deceleration torque including the set torque variation.

10. A motor vehicle in accordance with claim 7, wherein said control module sets the torque variation under gearshift position change to give a greater torque against a lower speed in the changed gearshift position, in the gearshift position changing condition where the driver shifts down the gearshift position and controls the motor with the total deceleration torque including the set torque variation.

11. A motor vehicle in accordance with claim 7, wherein said control module identifies the gearshift position changing condition to set the torque variation and control the motor until elapse of a preset time period since the change of the gearshift position.

12. A motor vehicle in accordance with claim 11, wherein said control module varies the preset time period corresponding to the changed gearshift position.

13. A motor vehicle in accordance with claim 12, wherein said control module varies the preset time period to have a longer time period against a lower speed in the changed gearshift position, in the gearshift position changing condition where the driver shifts down the gearshift position.

14. A motor vehicle in accordance with claim 11, wherein said control module varies the preset time period according to the measured vehicle speed.

15. A motor vehicle in accordance with claim 14, wherein said control module varies the preset time period to have a longer time period against a higher vehicle speed, in the gearshift position changing condition where the driver shifts down the gearshift position.

16. A motor vehicle in accordance with claim 1, said motor vehicle further comprising:
an internal combustion engine; and
an electric power-mechanical power input output mechanism that is connected to an output shaft of the internal combustion engine and to a drive shaft linked with drive wheels of said motor vehicle and outputs at least part of output power of the internal combustion engine to the drive shaft with input and output of electric power and mechanical power,
wherein said control module controls the internal combustion engine, the electric power-mechanical power input output mechanism, and the motor to decelerate said motor vehicle.

17. A motor vehicle in accordance with claim 16, wherein said control module controls the internal combustion engine, the electric power-mechanical power input output mechanism, and the motor to decelerate said motor vehicle with a deceleration torque produced by a rotation resistance of the internal combustion engine and a deceleration torque produced by regenerative control of the motor.

18. A motor vehicle in accordance with claim 16, wherein the electric power-mechanical power input output mechanism comprises:
a three shaft-type power input output module that is linked to three shafts, the output shaft of the internal combustion engine, the drive shaft, and a third rotating shaft, and automatically determines power input from and output to a residual one shaft based on powers input from and output to any two shafts among the three shafts; and
a generator that is capable of inputting and outputting power from and to the third rotating shaft.

19. A motor vehicle in accordance with claim 16, wherein the electric power-mechanical power input output mechanism comprises a pair-rotor motor that has a first rotor connected to the output shaft of the internal combustion engine and a second rotor connected to the drive shaft and outputs at least part of the output power of the internal combustion engine to the drive shaft with input and output of electric power and mechanical power by electromagnetic function of the first rotor relative to the second rotor.

20. A control method of a motor vehicle driven with output power of a motor having power generation capacity,
said control method setting a deceleration torque demand corresponding to a detected gearshift position in said motor vehicle moving under an accelerator released state selected by a driver, in a gearshift position fixing condition where the driver does not change the gearshift position, said control method controlling the motor to decelerate said motor vehicle with the set deceleration torque demand, in a gearshift position changing condition where the driver shifts down the gearshift position, said control method setting a torque variation under gearshift position change to give a larger torque against a lower speed in the changed gearshift position and controlling the motor to decelerate said motor vehicle with a total deceleration torque as a sum of the set deceleration torque demand and the set torque variation.

21. A control method of a motor vehicle driven with output power of a motor having power generation capacity, said control method setting a deceleration torque demand corresponding to a measured vehicle speed and a detected gearshift position in said motor vehicle moving under an accelerator released state selected by a driver, in a gearshift position fixing condition where the driver does not change the gearshift position, said control method controlling the motor to decelerate said motor vehicle with the set deceleration torque demand, in a gearshift position changing condition where the driver changes the gearshift position, said control method setting a torque variation under gearshift position change according to the measured vehicle speed and controlling the motor to decelerate said motor vehicle with a total deceleration torque as a sum of the set deceleration torque demand and the set torque variation.

* * * * *